INVENTOR.
DONALD J. FERGLE

Dec. 2, 1969  D. J. FERGLE  3,481,626

APPARATUS FOR PROTECTING A VEHICLE OPERATOR

Filed July 14, 1967  2 Sheets-Sheet 2

INVENTOR.
DONALD J. FERGLE
BY
Young, Raney, Flynn and Tarolli
ATTORNEYS

United States Patent Office 3,481,626
Patented Dec. 2, 1969

1

3,481,626
APPARATUS FOR PROTECTING A
VEHICLE OPERATOR
Donald J. Fergle, St. Clair Shores, Mich., assignor to
Eaton Yale & Towne Inc., Cleveland, Ohio, a corporation of Ohio
Continuation-in-part of application Ser. No. 616,917,
Feb. 17, 1967. This application July 14, 1967, Ser.
No. 653,562
Int. Cl. B60r *21/04;* B62d *1/18*
U.S. Cl. 280—150                    3 Claims

ABSTRACT OF THE DISCLOSURE

The operator of a vehicle is protected in a crash by moving the steering wheel and column away from the operator of the vehicle during the initial stages of the crash and inflating a confinement to fill a major portion of the area between the operator and the steering wheel. The confinement and steering wheel are moved in response to a sensing of a crash condition. The steering wheel is moved and the confinement is inflated during the initial portion of a crash and particularly during the time interval after the impact, but before the operator of the vehicle begins movement toward the steering wheel. The steering wheel is moved by explosive means and the confinement is inflated by a gas released from a container by explosive means and the movement of the steering wheel and inflation of the confinement occur extremely quickly.

---

This application is a continuation-in-part of copending application Ser. No. 616,917, filed Feb. 17, 1967, assigned to the assignee of the present application, and is entitled to the filing date thereof for the subject matter in common therewith.

The present invention relates to a method and an apparatus for protecting the operator of a vehicle during a crash, and particularly relates to a method and apparatus which effects movement of structural parts of the vehicle away from the operator and restrains movement of the operator toward those structural parts of the vehicle during a crash.

The principal object of the present invention is the provision of a new and improved method and apparatus for protecting the operator of a vehicle during a crash and which provides a great assurance of operator protection, is reliable, is practical and rapidly provides a safe environment for the operator upon the occurrence of a crash.

An important object of the present invention is the provision of a new and improved method and apparatus for protecting an operator of a vehicle during a collision by inflating a confinement into a location between the operator and the steering column and providing for movement of the steering column during the collision.

Another important object of the present invention is the provision of a new and improved method and apparatus for protecting an operator of a vehicle during a crash by managing the environment of the vehicle operator during the crash and wherein at least one structural part of the vehicle is moved away from the operator and an expandable confinement carried by the vehicle is expanded to fill a major portion of the area between the operator and the structural part to restrain movement of the operator of the vehicle toward the structural part of the vehicle.

A further object of the present invention is the provision of a new and improved method and apparatus for protecting the operator of a vehicle and in which the steering wheel of the vehicle is moved away from the operator of the vehicle during the crash and an inflatable confinement

2 is inflated to contact the operator and the confinement fills the area between the operator of the vehicle and the steering wheel, including the area occupied by the steering wheel prior to movement thereof, and restrains movement of the operator of the vehicle toward the steering wheel during the crash.

A still further object of the present invention is the provision of a new and improved method and apparatus, as noted in the next preceding object, wherein the steering wheel is explosively moved away from the operator of the vehicle in response to sensing of the crash and the confinement which restrains movement of the operator toward the steering wheel is inflated as a result of detonation of an explosive means.

Another object of the present invention is the provision of a new and improved method and apparatus for protecting the operator of a motor vehicle wherein a plurality of safety devices for protecting the vehicle operator are actuated explosively and wherein these devices are actuated and positioned with respect to the operator in the interval of time during a crash after vehicle impact with an obstruction but prior to substantial movement of the relative to the vehicle.

Further objects and advantages of the present invention will become apparent to those skilled in the art to which the invention relates from the following detailed description of a preferred embodiment thereof made with reference to the accompanying drawing forming a part of this specification and in which:

FIG. 1 is a schematic view illustrating a position of the operator and parts of the vehicle immediately after impact during a crash;

FIG. 2 indicates a further position of the operator of the vehicle during a crash and which is subsequent to the position shown in FIG. 1;

The present invention provides a new and improved method and apparatus for protecting the operator of a vehicle during a crash. While many attempts have been made for protecting the operator of a vehicle during a crash, none of the systems are sufficiently effective to protect the vehicle operator against sustaining serious injuries during a high speed crash. The present invention is directed to managing or controlling the environment of the operator in the vehicle to protect the operator during a crash.

Figure 1:
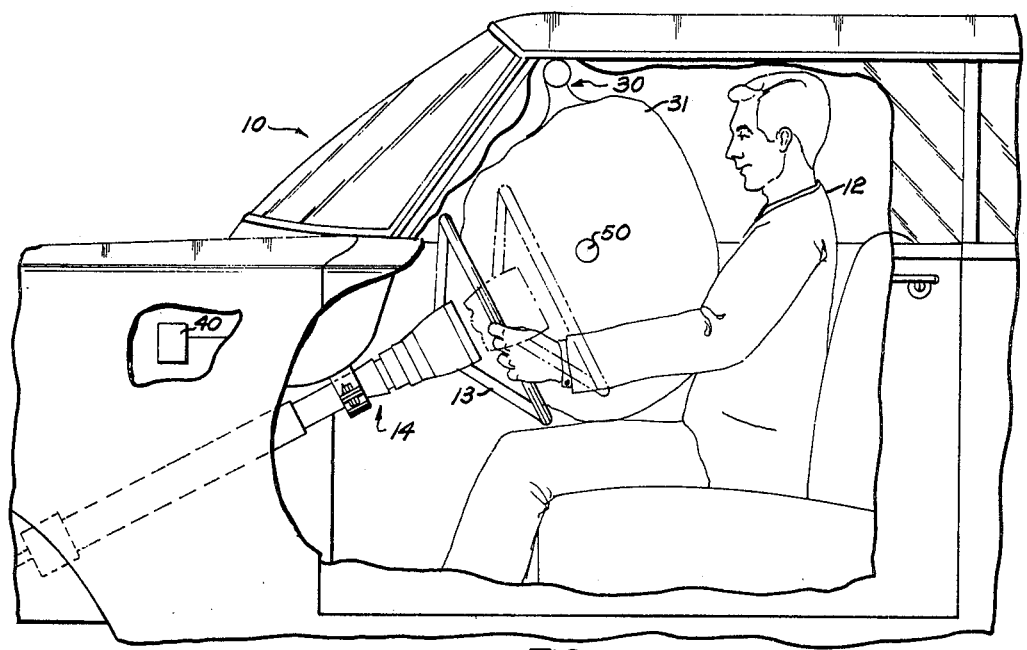

As representative of the present invention, FIG. 1 of the drawing illustrates a motor vehicle 10. The motor vehicle 10 is shown with an operator 12 seated in the operator's position. The operator 12, of course, steers the motor vehicle by a steering wheel 13 which is carried on the end of a steering column generally designated 14. The steering column is constructed for movement away from the operator of the vehicle during a crash.

Figure 4:
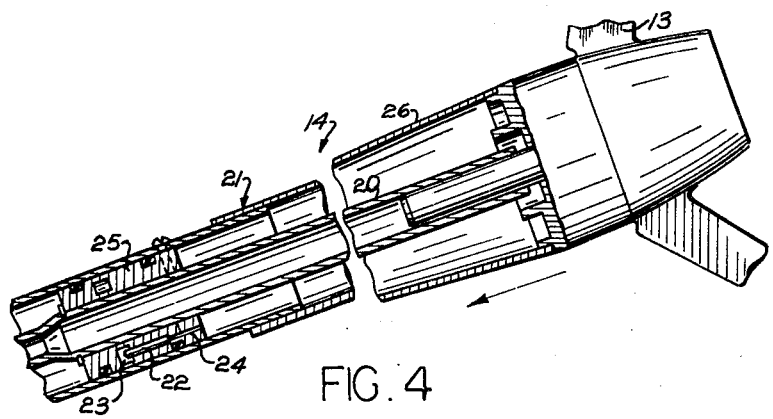
FIG. 4 is a sectional view illustrating portions of the steering column of the vehicle shown in FIG. 1.

The steering column construction is shown in FIG. 4 and is disclosed in detail in copending application Ser. No. 616,917 assigned to the assignee of the present application. The steering column 14 includes a steering shaft 20 which is operatively connected with the steering wheel 13 of the vehicle and which rotates upon rotation of the steering wheel 13. The shaft 20 is operatively connected with the steering gear of the vehicle and effects steering of the vehicle upon rotation thereof. A steering column housing 21 carries the steering wheel and surrounds the steering shaft 20. The steering shaft 20 is supported for downward movement in the direction of the arrow shown in FIG. 4, which is in a direction away from the operator of the vehicle. The steering shaft 20 is moved downwardly in the direction of the arrow in response to actuation of an explosive means 22. The explosive means 22 is at least in part located in a chamber 23 defined between a collar 24 fixed to the steering column housing 21 and a piston 25 fixed to the shaft 20. Upon actuation of the explosive means 22, the piston 25 is moved downwardly in the direction of the arrow and thereby effects movement of the shaft 20 therewith. Of course, since the steering wheel 13 is connected with the shaft 20, the steering wheel 13 also moves downwardly.

The portion 26 of the steering column housing which surrounds the steering shaft is deformable. This portion deforms when the steering shaft 20 moves downwardly upon actuation of the explosive means 22. The deformable portion 26 has a relatively low collapsing resistance and is readily collapsed upon actuation of the explosive means 22.

The vehicle 10 also includes a safety device 30 in the form of an expandible confinement device. In the preferred embodiment, the confinement is an inflatable confinement device which adds to the protection of the operator of the vehicle during a crash. The device 30 may be located at any location in the vehicle. It is shown for purposes of illustration as being located on the roof of the vehicle immediately above the steering wheel 13. The device 30 may be of different constructions. The device 30 may be as disclosed in copending application Ser. No. 562,289, now Patent No. 3,414,292, assigned to the assignee of the present application. The safety device is illustrated schematically in the drawing.

Figure 5:
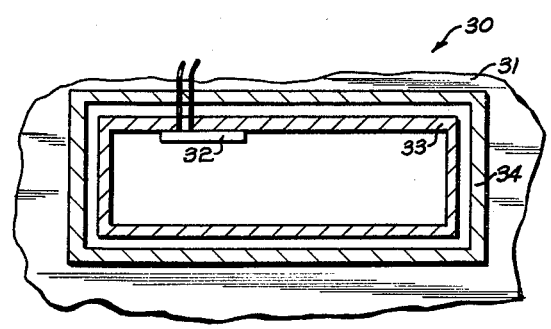
FIG. 5 is a schematic view of an inflatable air confinement safety device which is embodied in the vehicle of FIG. 1.

The safety device includes a confinement 31 which has a folded out of the way position and which is inflated during a crash. An explosive means 32 is associated with the confinement and with a source of pressurized fluid in the form of a gas filled pressure tube 33, see FIG. 5.

The gas filled tube 33 is supported in a diffuser tube 34 which has openings for directing the gas into the inflatable confinement. Upon actuation of the explosive means 32, an opening is formed in the pressure tube 33 and high pressure gas rushes from the pressure tube 33 through openings in the diffuser tube 34 and into the folded confinement. This gas expands the confinement and the confinement is inflated into contact with the vehicle operator. As shown in FIG. 1, the confinement when in its inflated condition substantially fills the area between the vehicle operator and the steering wheel 13, and, in fact, the confinement completely fills the area where the steering wheel 13 was prior to its movement by actuation of the explosive means 22.

When the vehicle 10 encounters a crash condition, the steering wheel 13 is moved downwardly away from the operator of the vehicle and the confinement 31 is inflated into position to protect the operator from impact with the steering wheel. Both the movement of the steering wheel 13 and inflation of the confinement 31 occurs substantially simultaneously and immediately after impact of the car with an obstruction. To this end, a sensing device 40 is provided for actuating the explosive means 22 and 32 which form a part of the steering column safety construction, as well as the safety device 30.

Figure 3:
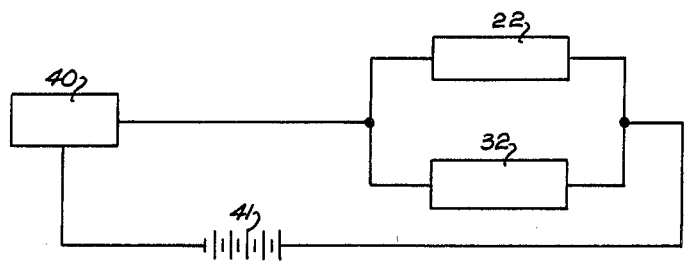
FIG. 3 is a schematic view illustrating circuitry for energization of safety devices embodied in the present invention.

The sensing means may be of any conventional form, such as shown in copending application Ser. No. 753,946 and assigned to the assignee of the present application. The sensing device 40 senses the initial contact between the vehicle and an obstruction and causes a circuit to be completed from the battery 41 of the vehicle, as shown in FIG. 3, through the sensing device 40 and to the explosive means 22, 32 for actuating the movement of the steering wheel 13 and the inflation of the confinement 31, respectively. Both of the explosive means 22, 32 are ignited at substantially the same time, immediately after the impact of the vehicle with the obstruction.

When the explosive devices 22, 32 are actuated, the steering wheel 13 is moved from the dotted line position shown in FIG. 1 to the full line position shown in FIG. 1 away from the vehicle operator, and thus the steering wheel is positioned relative to the operator to protect the operator from serious injury by impact with the steering wheel. Moreover, the inflatable confinement 31 is inflated into a position filling the major portion of the area between the operator and the steering wheel. The confinement is of sufficient size to not only fill the major portion of the area, but as a result there is engagement of the operator with the confinement relatively quickly during the crash as opposed to a cushion where substantial movement of the vehicle operator must occur before the operator and cushion engage.

The steering wheel 13 is moved downwardly and the confinement 31 is inflated during the interval of time immediately after the impact of the vehicle with the obstruction but prior to any movement of the operator forwardly relative to the vehicle as a result of the crash. It is well known that there is a time interval between the initial impact between the vehicle and an obstruction and the point at which the operator begins to move relative to the vehicle. Thus, during this time interval, both of the explosive actuated devices 22, 32 are energized and the environment of the vehicle operator is changed during the interval to greatly enhance the protection of the operator from serious injury during the crash. This time interval between the impact and the forward movement of the operator relative to the vehicle, of course, would vary depending upon a number of variables including the speed of the vehicle at the time of the crash. However, the steering wheel is moved downwardly and the confinement 31 is inflated by the explosive devices 22, 32, respectively, within .020 second after the point of impact with the obstruction. This relatively short time provides for extremely effective protection of the operator of the vehicle.

Figure 2:
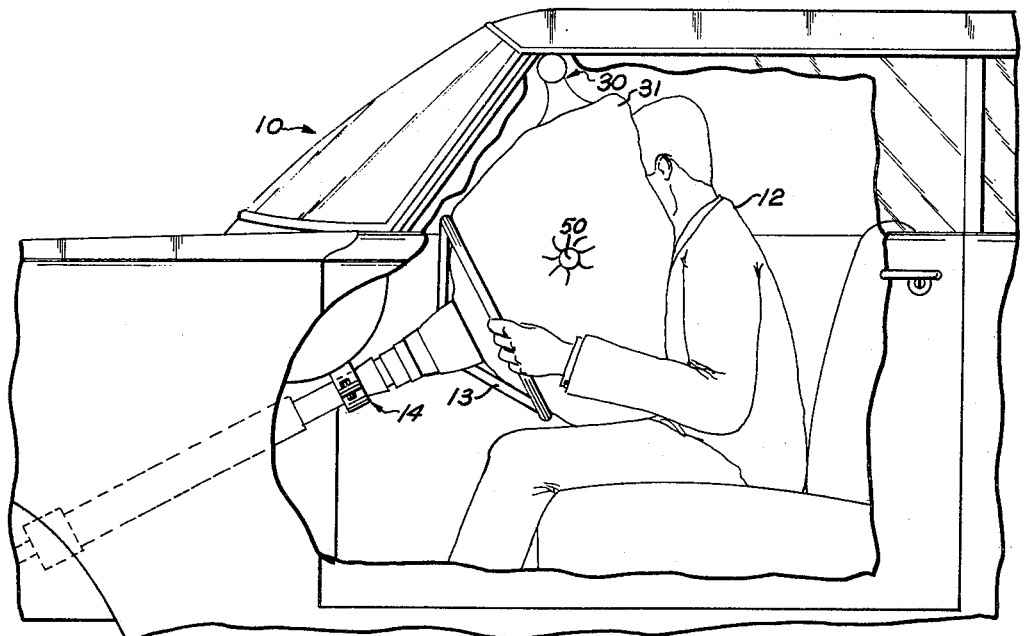

The confinement 31 shown in FIGS. 1 and 2 is provided with a means for dissipating the energy or absorbing the energy of movement of the operator of the vehicle so as to minimize rebound of the operator off the inflated confinement 31 when the operator contacts the confinement 31. The confinement 31 thus arrests the rate of movement of the operator and restrains the movement of the operator, but does not prevent movement of the operator of the vehicle. This is extremely important due to the fact that some movement of the operator of the vehicle is important to the protection of the operator of the vehicle during high speed crashes. Thus, the air confinement is provided so as to permit some movement of the operator but with a minimum of rebound of the operator, thereby minimizing whiplash injuries. In the present embodiment, these functions of the confinement are performed by a blowout patch 50 and which provides for an escape of gas from the confinement when the operator of the vehicle begins forward movement due to the crash. Other constructions may be made permitting such energy absorption, the blowout patch being only one such construction, and shown and described in greater detail in copending application Ser. No. 621,846 and assigned to the assignee of the present application.

In view of the foregoing, it should be apparent that applicant has provided a new and improved method of protecting the operator of a vehicle during a crash condition. Specifically, the method involves the movement of those parts of the vehicle which would cause damage or injury to the operator, if he contacted them, away from the operator. Moreover, an inflatable confinement is positioned intermediate the structural parts of the vehicle and the operator and restrains movement of the operator toward those parts of the vehicle. The various safety mechanisms and devices which are utilized for protecting the operator are actuated by explosive means which provide a rapid actuation of the devices well within the time allotted for protection of the operator of the vehicle even during high speed crashes. Furthermore, it should be apparent that other means, such as hydraulic or mechanical means, may be utilized to actuate the safety devices.

While the drawings illustrate a steering column which is retractable by longitudinal movement of one member of the column relative to another, the steering column construction could be one in which the steering column is pivoted or otherwise moved upon actuation of a means for effecting the movement. Moreover, the steering column could be constructed, as is well known, to yield upon an impact force acting thereon. In such a case the inflatable confinement, which is inflated into the location between the operator of the vehicle and the steering wheel, would transmit the force of engagement of the operator thereagainst to the steering column, which would then yield and move downwardly.

It should be apparent from the above, that applicant has provided a new and improved method and apparatus for protecting the operator of a vehicle and managing the safety of the operator of a vehicle, even in high speed crashes, and that vertain modifications, changes, and adaptations may be made in the preferred embodiment described in detail hereinabove, and it is intended to cover all such modifications, changes, and adaptations which come within the scope of the appended claims.

I claim:

1. Safety apparatus for providing protection during an accident for an operator of a vehicle having steering means, said safety apparatus comprising sensor means for sensing an accident condition, means responsive to operation of said sensing means for moving the vehicle steering means away from the operator, said means for moving the vehicle steering means comprising first explosive means detonated upon operation of said sensing means to effect said movement of said vehicle steering means, means for restraining movement of the operator relative to the steering means during the accident including an expandable confinement carried by the vehicle, said confinement having a collapsed inoperative position and an expanded operative position disposed between the steering means and the operator, said confinement when in said expanded operative position being operable to restrain movement of the operator, and means for expanding said confinement to dispose said confinement in said expanded operative position, said means for expanding said confinement comprising a source of fluid and second explosive means for effecting flow of fluid from said source into said confinement and activated upon operation of said sensing means.

2. A safety apparatus as defined in claim 1 wherein said sensor means is effective to actuate both of said explosive means within a time interval between the initiation of the accident and movement of the operator relative to the vehicle as a result of the accident.

3. A safety apparatus as defined in claim 1 wherein said expandable confinement is supported on a part of the vehicle other than said steering means.

References Cited

UNITED STATES PATENTS 3,197,234    7/1965    Bertrand _____ 280—150
3,411,808    11/1968    Chute _____ 280—150

LEO FRIAGLIA, Primary Examiner

J. E. SIEGEL, Assistant Examiner

U.S. Cl. X.R.

74—493